Sept. 1, 1953 R. M. HENDERSON 2,650,611
ANTIFREEZE VALVE ASSEMBLY
Filed Oct. 17, 1950
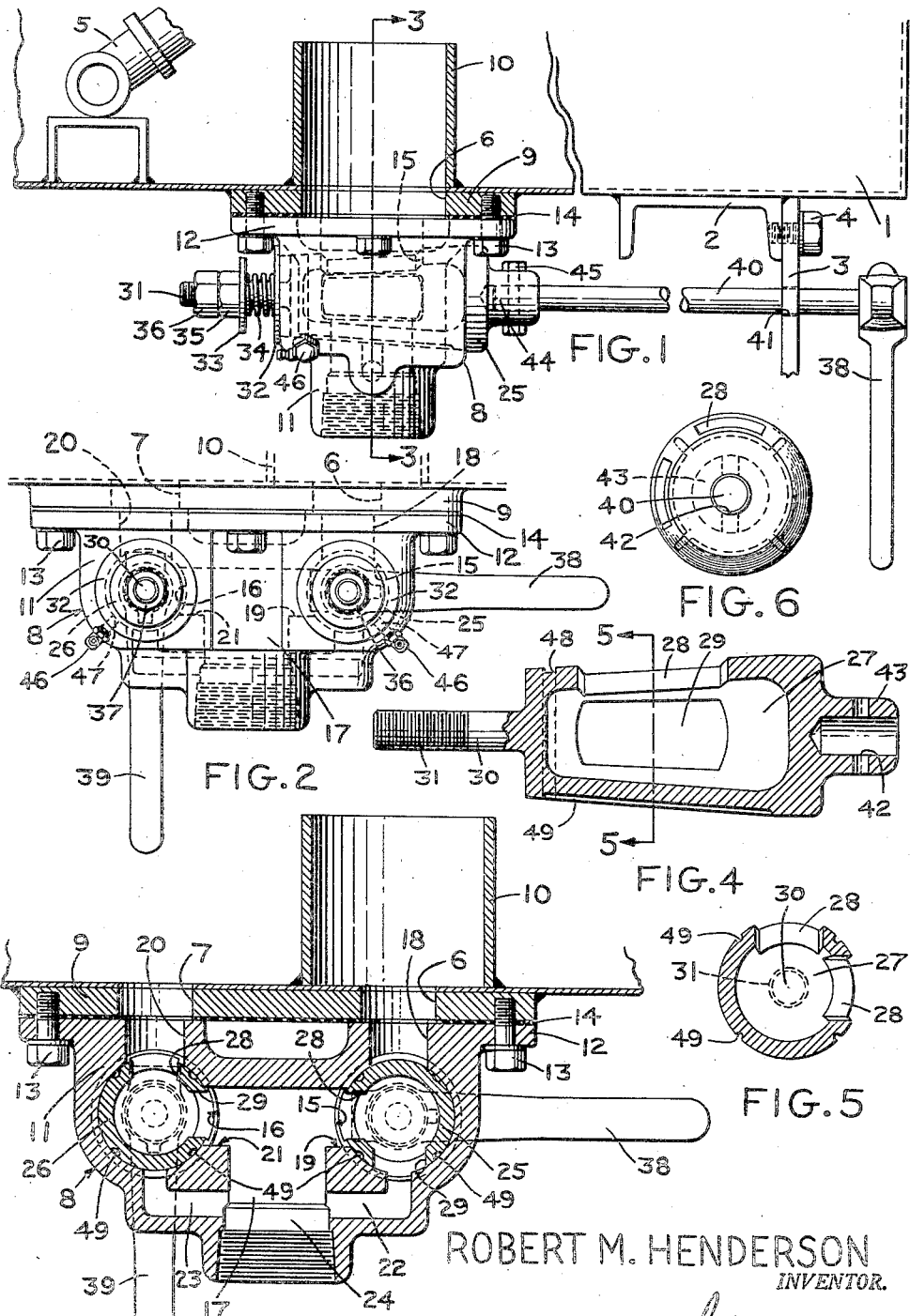
ROBERT M. HENDERSON
INVENTOR.
BY Patented Sept. 1, 1953

2,650,611

UNITED STATES PATENT OFFICE 2,650,611

ANTIFREEZE VALVE ASSEMBLY

Robert M. Henderson, Springfield, Vt., assignor to Worthington Corporation, Harrison, N. J., a corporation of Delaware Application October 17, 1950, Serial No. 190,609

4 Claims. (Cl. 137—637)

This invention relates generally to valves for water tanks and more particularly to an anti-freeze valve assembly for the combined mixing and flushing water tank on a transit type truck mixer.

It has been found that under winter operating conditions where the temperature drops below freezing that the present type of valves used on the combined mixing and flushing water tanks of transit type truck mixers will freeze up so that water cannot be fed to the mixing drum from the water tank and usually some outside supply must be utilized.

The present invention contemplates a novel anti-freeze valve assembly which comprises hollow plug type valves laterally disposed in the valve assembly, which communicates with suitable by-pass passages to allow all the water in the valve assembly to drain out by gravity flow when the valves are closed, to prevent freezing during winter operations.

Accordingly, it is an object of the present invention to provide an anti-freeze valve assembly for the combined mixing and flushing water tank of a transit type truck mixer.

It is another object of the present invention to provide an anti-freeze valve assembly wherein hollow laterally disposed plug type valves are utilized to conduct fluid from the valve assembly by suitable coaction with by-pass passages.

It is another object of the present invention to provide relatively easily lubricated hollow plug type valves for an anti-freeze valve assembly which when disposed in the open position will have inlet and discharge ports for conducting fluid from the mixing and flushing water tank and when disposed in the closed position will allow water to drain from the valve assembly through the interaction of the inlet and discharge ports with by-pass means provided in the valve assembly.

It is another object of the present invention to provide hollow plug type valves for the anti-freeze valve assembly in the combined mixing and flushing water tank on transit type truck mixers which has ports and passages therein adapted to communicate with a suitable grease fitting on the valve assembly whereby the plug type valve may be kept well lubricated and operate freely at all times.

With these and other objects in view, as may appear from the accompanying specification, the invention consists of various features of construction and combination of parts, which will be first described in connection with the accompanying drawings, showing an anti-freeze valve assembly of a preferred form embodying the invention, and the features forming the invention will be specifically pointed out in the claims.

In the drawings:

Figure 1 is a side view partly in section showing a fragment of the water tank with the invention attached thereto with its respective valves and passages phantomized.

Figure 2 is a rear view showing the grease fittings and having the passages, valves and chambers therein phantomized.

Figure 3 is a section taken on the line 3—3 of Figure 1.

Figure 4 is a longitudinal section of one of the hollow plug type valves.

Figure 5 is a cross-section taken on the line 5—5 of Figure 4.

Figure 6 is an end view of the hollow plug type valve showing the grease passages and valve ports therein.

Referring more particularly to the drawings, Figure 1 shows a water tank 1, which may be any suitable type of mixing and flushing tank utilized on transit type mixers of which there are several well known types of sheet metal construction easily available on the open market. It is understood that while this type of water tank is shown and described that the present valve assembly may be applied to any water tank which is utilized under freezing conditions.

The water tank 1 has a substantially hollow cylindrical shape and is supported by cross members 2 and side supports 3 connected as at 4 by suitably threaded means between the cross members 2 and the truck chassis (not shown). Inlet means (not shown) are provided for supplying water to the interior of the tank. A movable overflow means 5 shown in fragmentary form will act to regulate the level of the water in the water tank as desired.

At the generally lowest point on the water tank, a mixing outlet 6 and a flushing outlet 7 is provided for discharging the water from the interior of said tank 1 to an anti-freeze valve assembly 8 attached to the outside thereof as hereinafter described which will control the flow of water from the tank to the mixing drum (not shown) of the transit type mixer (also not shown). The abovementioned parts are not shown because they do not form a part of the present invention. It is understood that while only two openings are shown that additional openings could be provided with suitable controlling means therefor in the anti-freeze valve assembly if it is found to be necessary.

To increase the strength of the tank 1 at the part where the mixing outlet 6 and the flushing outlet 7 are located, and to provide means for supporting the said anti-freeze valve assembly 8, a support plate 9 is welded to the tank on the outside thereof about the mixing outlet 6 and flushing outlet 7. A stand pipe 10 is also welded on the inside of the tank about the mixing outlet 6 and flushing outlet 7 so that when water is drawn off through the mixing outlet 6 as hereinafter described, there will always remain in the tank sufficient water for flushing the mixing drum (not shown). For flushing purposes the flushing outlet 7 is utilized to draw off the flushing water, all of which is clearly shown in Figures 1 and 3 of the drawings.

Anti-freeze valve assembly

The anti-freeze valve assembly 8 is clearly shown in Figures 1, 2 and 3, to include a substantially rectangular box-like housing 11. A flange 12 continuous with the upper flat surface thereof has bolts 13 extending therethrough, to connect the valve assembly 8 to the support plate 9, a gasket member 14 being provided between the upper flat surface of the valve housing 11 and the support plate 9 to insure a water tight connection therebetween.

A frustro-conical shaped mixing valve chamber 15 and a frustro-conical shaped flushing valve chamber 16 extend through and through the valve housing 11 in a substantially horizontal plane. Disposed between said valve chambers 15 and 16 in the valve housing is a discharge chamber 17, clearly shown in Figure 3 of the drawings.

Mixing valve chamber 15 communicates with the mixing outlet 6 through inlet passage 18 formed in said housing to allow water to flow from the interior of the water tank to the valve chamber 15. A mixing valve discharge passage 19, in said housing provides communication between said mixing valve chamber 15 and the discharge chamber 17.

Flushing valve chamber 16, similarly is provided with a flushing valve inlet passage 20 connecting the valve chamber 16 with the interior of the water tank through the flushing outlet 7, and a flushing valve discharge passage 21 will provide communication between said valve chamber 16 and the discharge chamber 17.

The mixing and flushing discharge passages 19 and 21 are formed in said housing 10 at approximately 90° to their respective mixing and flushing valve inlet passages 18 and 20, and since the discharge chamber 17 is disposed between these valve chambers 15 and 16, the mixing and flushing discharge passages 19 and 21 will open on substantially opposite sides of said discharge passage, and accordingly may be disposed to give the water discharged from the respective valve chambers as hereinafter described a slight swirling motion to aid the movement thereof through the discharge chamber.

The mixing and flushing valve chambers 15 and 16 are further provided with by-pass passages 22 and 23, which are formed in said valve housing 10; opening at one end in said valve chambers 15 and 16 respectively substantially opposite to their respective inlet passages 18 and 20 and at approximately 90° to their respective discharge passages 19 and 21, and at the other end on opposite sides of a discharge outlet 24 formed at the lowermost portion of the discharge chamber 17 in the housing. The discharge outlet communicates by suitable means with the mixing drum (not shown) of the transit mixer (also not shown), all of the above being clearly shown in Figure 3 of the drawings.

Plug type valve

To control the flow of water from the water tank 1 and through the various chambers and passages above mentioned plug type valves 25 and 26 are rotatably mounted in their respective valve chambers 15 and 16, as is clearly shown in Figures 1 and 3 of the drawings.

Plug type valves 25 and 26 are identical and accordingly as is shown in Figures 4 and 5 of the drawings, wherein one of said valves is shown in cross section as substantially frustro-conical in shape so as to be adapted for rotatable mounting in water-tight relationship with said frusto-conical valve chambers 15 and 16; it is understood, however, that while this shape is utilized that other shapes may be utilized to accomplish the same purpose.

Formed in each of said valves is a hollow chamber 27 having inlet ports 28 and at substantially right angles thereto discharge ports 29 communicating therewith through the hollow chamber and extending through the walls of the respective valves 25 and 26, as is clearly shown in Figures 3, 4 and 5 of the drawings.

It can readily be seen that when the plug type valves are turned to an open position, the open position being indicated by the flushing valve 26 in Figure 3 of the drawings, the inlet ports will communicate with the inlet passages and the discharge ports will communicate with the discharge passages which will allow the water to flow from the water tank to the discharge chamber 17 by gravity flow.

Conversely, when the plug type valves are turned to a closed position, the closed position being indicated by the mixing valve 25 in Fig. 3 of the drawings, the inlet ports will communicate with their respective discharge passages 19 and 21, and the discharge ports will communicate with their respective by-pass passages 22 and 23, thus allowing all water in the valve assemblies to drain out of the housing 11 and the plug type valves 25 and 26 by gravity flow to eliminate any possibility of water freezing in the housing 11 of the valve assembly.

Figures 1, 2 and 4 show that valves 25 and 26 are maintained in water tight relationship by an elongated portion 30 which is threaded as at 31 so that on mounting the plug type valves 25 and 26 in the frusto-conical valve chambers 15 and 16, the elongated portion 30 will extend outwardly of the valve housing 11. To hold the valves in their respective positions, washers 32 and 33 are mounted about the elongated portion 30 with springs 34 therebetween. When nuts 35, clearly shown in Figure 1, are tightened to abut the washer 33, the spring member 34 will abut washer 32 which in turn abuts the valve housing 11. Nuts 35 may be tightened to any desired degree, to secure the water tight relationship between the valve chambers 15 and 16 and the respective valves 25 and 26, and then locked in position by locking nuts 36 and 37, as is clearly shown in Figure 2 of the drawings. The spring 34 and washers 32 and 33 offer resilient surfaces to allow for rotation of the plug type valves 25 and 26 as is hereinafter described.

Plug type valves 25 and 26 are rotated normally by means of operating handles 38 and 39. The operating handles are fixedly connected to one end of elongated operating rods 40 which extend to a point outwardly of the supports 3 from the water tank in which they are rotatably mounted as at 41, to make the operating handles easily accessible to the operator.

The other end of said operating rods 40 are fixedly connected to the plug type valves 25 and 26 by means of bores 42 formed in the projections 43 formed on the valves 25 and 26 in the axial line thereof at the end opposite to the elongated portion 30. The ends 44 of the operating rods 40 fit into said bores 42 and are fixedly connected to the plug type valves by means of pin members 45 which extend through said projection 43 at right angles to the axial line of the bores 42 and operating rods 40. It is understood that while this type of means for fixedly connecting said operating rods 40 to the valves 25 and 26 is shown and described that other types of connections might be utilized to accomplish this purpose.

*Means for greasing the plug type valves*

To prevent water from adhering to the outer surface of the plug type valves 25 and 26 or to collect between the surfaces of the valve chambers 15 and 16 and the said valves, and to provide means for lubricating the valves, a grease fitting 46 is threadably connected to the outer surface of the valve housing 11, which is adapted to receive grease or suitable lubricant, from a gun type mechanism which is well known in the art.

The grease fitting 46, will communicate by means of passages 47, shown in Figures 1 and 2 of the drawings, with annular grooves 48 clearly shown in Figure 4 of the drawings which are formed at one end of the valves 25 and 26. Longitudinally disposed grease passages 49 are found on the outer surface of the said valves, and communicate with the annular groove 48 so that grease or other lubricant forced through the grease fitting 46, passage 47 and annular groove 48 will be carried the full axial length of the valves 25 and 26. It may be further distributed on the contiguous surfaces of the valve chambers 15 and 16 by rotation of the valves 25 and 26 in the valve chamber.

In operation, when it is desired to turn either the mixing or flushing valve 25 or 26, one or the other of the operating handles 38 and 39 is grasped manually and turned, the open position being indicated by handle 39 in Figure 3, wherein the handle members are in the vertical position, and the closed position being indicated by handle 38 in Figure 3, wherein the handle members are in the horizontal position. Since the operating handles 38 and 39 are fixedly connected to the operating rods 40 which are in turn fixedly connected to the valves 25 and 26, as the handles are rotated to one or the other of the said positions the valves 25 and 26 will also be rotated so as to allow water to flow from the water tank 1 to the discharge outlet 24 as above described.

Under winter operating conditions, usually hot water is used which allows it to be transported a considerable distance as it will not lose heat too rapidly. The valve members 25 and 26 while in transport will be in the closed position and accordingly any residue water which remained in the valve housing 11, will drain from the valves 25 and 26 through the by-pass passages 22 and 23 and the discharge outlet as above described so that no water can freeze in the housing 11. Similarly after use when the valves 25 and 26 are both turned to the closed position the water will once again drain out of the housing 11 by gravity flow.

While one form of this invention has been illustrated and described, it will be understood that the invention is not to be limited to the specific construction or arrangement of parts shown but that they may be widely modified within the invention defined by the claims.

What is claimed is:

1. An anti-freeze valve assembly for the mixing and flushing tank provided on transit type truck mixers comprising, a valve housing connected to the outside of said water tank at its lowermost portion, at least two valve chambers in said valve housing, a common discharge chamber formed in said housing and provided with a discharge outlet at its lowest point, inlet passages communicating at one end with said water tank and at the other end with said valve chambers, outlet passages for said valve chambers at substantially right angles to the inlet ends of said inlet passages and providing communication between said valve chambers and said discharge chamber, by-pass passages for each of said valve chambers disposed at the lowermost point thereof at substantially right angles to said outlet passages formed in the valve chamber and opposite to the inlet ends of said inlet passages, a hollow plug type valve member rotatably mounted in each of said valve chambers, inlet and discharge ports for each of said valve members, said inlet and discharge ports adapted to coact with said inlet outlet and by-pass passages whereby when said valve member is rotated to an open position water will drain by gravity flow from said water tank to said discharge outlet and when rotated to a closed position will drain from the discharge chamber and from the valve chamber through the by-pass passages to the discharge outlet by gravity flow.

2. An anti-freeze valve assembly for the water tank having a mixing and flushing water compartment on a transit type truck mixer comprising, a housing connected to said water tank, at least two valve chambers in said valve housing, one of said valve chambers having an inlet communicating with the mixing compartment of the water tank, another of said valve chambers having an inlet communicating with the flushing compartment of said water tank, a discharge chamber in said housing disposed centrally of said valve chambers and provided with a discharge outlet at its lowermost point, said valve chambers provided with outlets opening into said discharge chamber, a hollow plug type valve rotatably mounted in each of said valve chambers, each of said valves having an inlet port and a discharge port communicating therewith, a by-pass means at the lowermost point of each of said valve chambers providing communication between said valve chambers and said discharge outlet, and said rotatable valve in its normally closed position to allow all water therein to drain through the by-pass means to the discharge outlet and in the normally open position to drain its respective mixing and flushing water compartment to said discharge outlet.

3. An anti-freeze valve assembly for the water tank having a mixing and flushing water compartment on a transit type truck mixer as claimed in claim 2 wherein the discharge outlet is disposed parallel to said inlets and the by-pass means is disposed in said chamber opposite to said inlet and communicates at right angles with said discharge outlet.

4. An anti-freeze valve assembly for the mixing and flushing tank provided on transit type truck mixers comprising, a valve housing connected to the outside of said water tank at its lowermost portion, at least two valve chambers in said valve housing, a common discharge chamber formed in said housing and provided with a discharge outlet at its lowest point, inlet passages communicating at one end with said water tank and at the other end with said valve chambers, outlet passages for said valve chambers at substantially right angles to the inlet ends of said inlet passages and providing communication between said valve chambers and said discharge chamber, by-pass passages for each of said valve chambers disposed at the lowermost point thereof at substantially right angles to said outlet passages formed in the valve chamber and opposite to the inlet ends of said inlet passages, a hollow plug type valve member rotatably mounted in each of said valve chambers, inlet and discharge ports for each of said valve members, said inlet and discharge ports adapted to coact with said inlet outlet and by-pass passages whereby when said valve member is rotated to an open position water will drain by gravity flow from said water tank to said discharge outlet and when rotated to a closed position will drain from the discharge chamber and from the valve chamber through the by-pass passages to the discharge outlet by gravity flow, and means for lubricating the plug type valve including longitudinal passages circumferentially spaced about said plug type valve member, an annular groove providing communication between said longitudinal passages and a supply passage formed in said housing, and a lubrication fitting fixedly mounted to the outside of said valve housing and communicating with said supply passage to allow lubrication to be forced to said supply passage for lubricating said plug type valves.

ROBERT M. HENDERSON.

References Cited in the file of this patent

UNITED STATES PATENTS

| Number | Name | Date |
|---|---|---|
| 11,550 | Hatcher | Aug. 22, 1854 |
| 597,600 | Anzelwitz | Jan. 18, 1898 |
| 663,723 | Brown et al. | Dec. 11, 1900 |
| 1,519,827 | Fuge | Dec. 16, 1924 |
| 1,705,101 | Smith | Mar. 12, 1929 |
| 2,025,851 | Davis | Dec. 31, 1935 |
| 2,091,379 | Stadler | Aug. 31, 1937 |
| 2,433,471 | Mager | Dec. 30, 1947 |